Patented July 1, 1930

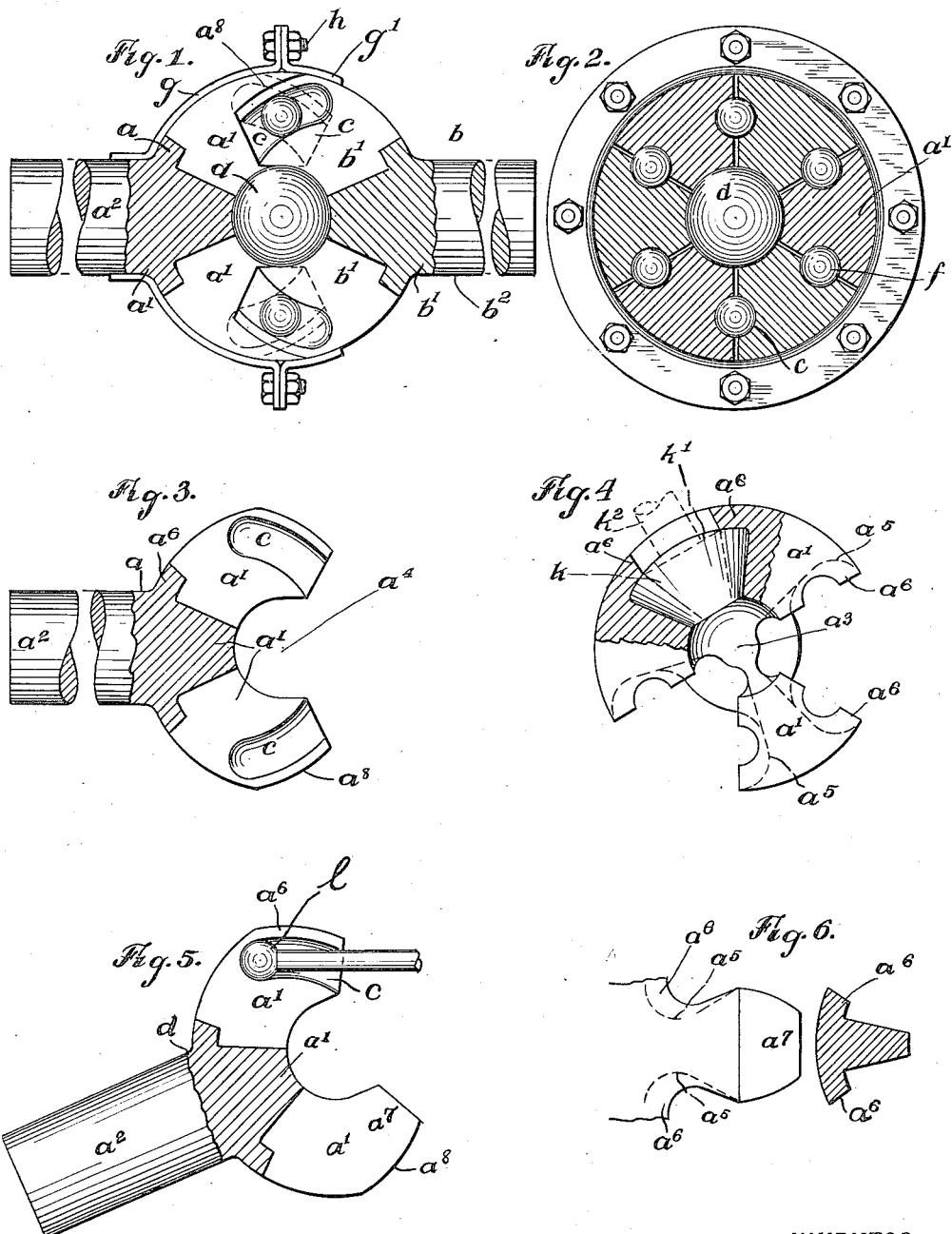

1,769,762

UNITED STATES PATENT OFFICE

CARL W. WEISS, OF NEW YORK, N. Y.

UNIVERSAL JOINT

REISSUED

Application filed July 26, 1929. Serial No. 381,114.

This invention relates to universal joints of the character of that shown in Letters Patent of the United States No. 1,522,351 dated January 6, 1925, in which the two members capable of relative angular displacement have co-acting portions with proximate faces formed with non-concentric grooves with their longitudinal axes intersecting at an angle and a relatively movable body received partly in each of such grooves and through which force is transmitted from one coacting portion to the other, such relatively movable body lying always in a plane which bisects the angle of displacement of the two members, whereby there is no relative fluctuation of angular velocity of the driven member as compared with that of the driving member. Universal joints constructed as shown and described in said patent, are well adapted for use where the angle of displacement does not much exceed 20°, as in their application to propeller shafts in the conventional rear wheel drive of automobiles. When, however, the relative angular displacement of the two members of the universal joint is much larger than 20°, as in the application of universal joints to the front wheel drive of automobiles, and provision for angular displacement of 35° or 40° must be made, regard must be had to considerations which are not obvious when the angle of displacement is relatively small. Thus, not only must the unit which embodies the universal joint be small in diameter so as to permit, for example, the placing of the steering knuckles and brake drum within the established wheel radius of the conventional rear wheel drive, but it must have a much greater torque capacity. The torque capacity of the conventional propeller shaft unit must be equal to the engine torque multiplied by the transmission gear reduction, or four times the engine torque if the ratio of the low gear transmission is 4:1. When such unit is placed directly in the wheel, for front wheel drive, its torque capacity must be equal to the engine torque multiplied by the transmission gear reduction and again multiplied by the differential ratio and is expressed by the formula $\frac{T \times 4 \times 4}{2}$, or twice the torque capacity of the universal joint applied to the rear drive propeller shaft. Because of the limitation of space the universal joint cannot be increased in size in proportion to the increase in torque. At the same time, the increase in space required, with the greater angular displacement, for the coaction of the projecting portions or teeth, as they may be called for convenience, of the two members of the joint reduces the dedendum section of the tooth to such an extent that, in such a construction as that illustrated in the patent above referred to, the torque capacity of the joint would be greatly reduced and, in such location, the joint would not be capable of transmitting the required torque. It is, therefore, the object of the present invention to modify the construction of the joint shown in said patent in such manner that each such projecting portion or tooth of each member shall be reinforced sufficiently to compensate for the reduced dedendum section required by the greater angular displacement of the joint. In accordance with the invention each tooth is so formed, either in cutting or by the welding on of a reinforcement, that the tooth is strengthened to the degree necessary to give it the required torque capacity notwithstanding the reduction of the dedendum section necessary to permit the greater angular displacement. In accordance with the invention each projecting portion or tooth is extended beyond the reduced contact portion of its dedendum to form a reinforcement sufficient to compensate for the reduction of the dedendum section.

The invention will be more fully explained hereinafter with reference to the accompanying drawing in which it is illustrated and in which:

Figure 1 is a view in longitudinal section through a universal joint which embodies the invention, the intermediate, relatively movable bodies, the central, spherical supporting member and the shafts, which are broken off to save space, being shown in elevation.

Figure 2 is a view in transverse sectional elevation of the joint shown in Figure 1.

Figure 3 is a view in longitudinal, sectional elevation of one of the members of the joint.

Figure 4 is a view in end elevation of the member shown in Figure 3, the position of the cutter by which the teeth of the member are formed being also indicated.

Figure 5 is a view generally similar to Figure 3 but illustrating the position of the milling cutter in milling one of the grooves.

Figure 6 shows a view in elevation of one of the teeth and a view of the same in section.

In the embodiment of the invention illustrated in the drawing the driving member $a$ of the joint is formed with three projecting portions or teeth $a^1$ with radial faces and designed to coact with corresponding projecting portions or teeth $b^1$ of the driven member $b$. The members $a$ and $b$ are shown as formed integral with the shaft portions $a^2$ and $b^2$, respectively, and the two members are shown as centered upon a spherical bearing $d$. In the proximate face of each projecting portion or tooth $a^1$, $b^1$, of the two members $a$, $b$, there is formed a groove $c$. The two grooves of the two proximate faces of coacting portions of teeth of the joint members are formed as described in said patent, so that their longitudinal axes, whether straight or curved, are non-concentric or are oppositely disposed with respect to each other so that they intersect, in all positions of angular displacement of the joint, in a plane which bisects the angle of displacement of the two members. Force is transmitted from one member of the joint to the other, not through contact of the proximate faces of the coacting portions, or teeth of the two members, but through an intermediate and relatively movable body which is shown as a roller or ball $f$. The two members of the joint may be retained in operative relation by partly spherical, flanged shells $g$ and $g^1$ and bolts $h$. All of the parts thus far referred to may be arranged and operate in the same manner as in the universal joint shown and described in said patent and their arrangement and operation need not be further described herein.

The present invention is concerned with the formation of the proximate faces of the coacting projections or teeth of the two members of the joint so as to provide the space necessary to permit the relatively angular displacement of the two members through a relatively large angle, such as 30° or 40°, for example, and at the same time compensate for the reduction of the dedendum section of each tooth incident to the provision of such space. To enable the formation of the tooth to be understood more readily it will be best to describe first one way in which the tooth is formed as to its proximate faces, it being understood that each tooth is first formed by any suitable means substantially as shown in said patent, the three teeth being distributed at equal distances and spaced apart by equal spaces. When the member has been thus formed it is placed in a milling machine and a truncated milling cutter $k$, such as that represented by broken lines in Figure 4, is introduced between the flat, proximate faces of two successive teeth, the cutter being introduced to such a distance that its outer or rearward face $k^1$, adjacent to its stem $k^2$, is moved within the outer periphery of the joint member to a substantial distance, as indicated in Figure 4. Then the joint member is oscillated about its axis $a^3$, indicated in Figure 4, so that the cutter cuts into the lateral faces of the teeth of the joint member and is also oscillated upon the axis $a^4$, indicated in Figure 3, so that the proximate faces of the teeth of the joint member are cut out in an axial direction with respect to the joint member. It will be understood that the joint member may be oscillated in either one or both of the directions referred to while the milling cutter rotates on a fixed axis, or that the milling cutter may itself be oscillated with respect to the joint member so as to cut out the material of the proximate faces of the two teeth.

It will be seen that the effect of this milling operation is to cut away or reduce the dedendum of each tooth, as indicated by the broken lines at $a^5$ in Figure 6, and at the same time to leave a reinforcement, indicated at $a^6$, tapering from the body of the joint member to the pitch line of the tooth, forming a substantial reinforcement for the tooth sufficient to compensate for the reduced section of the dedendum. This reinforcement extends beyond or overlaps laterally the space between the dedenda of two adjacent teeth. It will be obvious that this reinforcement might be formed by welding a reinforcing piece to the other radially outside of the contact faces of the teeth, being an integral part of each tooth whether the tooth is formed by milling or by welding. After the proximate faces of the teeth have been formed as described the grooves $c$ may be formed therein as by a spherical or other suitably formed milling cutter, as indicated at $l$ in Figure 5.

It will be observed that the addendum $a^7$ of each tooth is cut away somewhat, as indicated at $a^8$ in Figures 1, 3 and 5, in order that it may enter the corresponding space between two teeth of the opposite member within the line of the reinforcement.

I claim as my invention:

A universal joint having two members capable of relatively angular displacement and having coacting teeth with their proximate faces formed with non-concentric grooves intersecting at an angle and a relatively movable body received partly in each of such grooves and through which force is transmitted from one coacting portion to the other, each proximate face of each tooth being milled out within its outer surface to form a space between two adjacent teeth for coaction with the corresponding tooth of the other member, and to leave a reinforcing portion at the outer surface of each tooth at each side extending laterally over the space between adjacent teeth.

This specification signed this 24th day of July A. D. 1929.

CARL W. WEISS.